United States Patent
Rao et al.

(10) Patent No.: US 12,316,748 B2
(45) Date of Patent: May 27, 2025

(54) ENFORCING MULTI-OWNERSHIP OF DATA ON STORAGE

(71) Applicant: Kyndryl, Inc., New York, NY (US)

(72) Inventors: Dwarkanath P. Rao, Dublin (IE); Utz Bacher, Dettenhausen (DE)

(73) Assignee: Kyndryl, Inc., New York, NY (US)

( * ) Notice: Subject to any disclaimer, the term of this patent is extended or adjusted under 35 U.S.C. 154(b) by 441 days.

(21) Appl. No.: 17/536,943

(22) Filed: Nov. 29, 2021

(65) Prior Publication Data

US 2023/0171089 A1    Jun. 1, 2023

(51) Int. Cl.
  *H04L 9/08*    (2006.01)
  *H04L 9/14*    (2006.01)
  *H04L 9/32*    (2006.01)

(52) U.S. Cl.
  CPC .......... *H04L 9/0825* (2013.01); *H04L 9/0877* (2013.01); *H04L 9/14* (2013.01); *H04L 9/3228* (2013.01)

(58) Field of Classification Search
  CPC ....... H04L 9/0825; H04L 9/0877; H04L 9/14; H04L 9/3228
  USPC ......................................................... 713/171
  See application file for complete search history.

(56) References Cited

U.S. PATENT DOCUMENTS

| | | | | |
|---|---|---|---|---|
| 5,970,149 | A * | 10/1999 | Johnson | H04L 63/18 380/278 |
| 10,461,943 | B1 * | 10/2019 | Norum | H04L 63/0823 |
| 11,303,432 | B2 * | 4/2022 | Levin | H04L 63/06 |
| 2012/0246463 | A1 | 9/2012 | Shea et al. | |
| 2013/0166911 | A1 * | 6/2013 | Daouphars | H04L 9/14 713/168 |
| 2016/0285625 | A1 | 9/2016 | Roth et al. | |
| 2017/0063531 | A1 * | 3/2017 | Sullivan | G06F 21/6209 |
| 2017/0085377 | A1 | 3/2017 | Pogmore et al. | |
| 2018/0060596 | A1 * | 3/2018 | Hamel | H04L 9/088 |
| 2018/0176013 | A1 | 6/2018 | Cheng et al. | |
| 2019/0097791 | A1 | 3/2019 | Hersans et al. | |
| 2019/0173674 | A1 | 6/2019 | Agarwal et al. | |
| 2020/0053065 | A1 | 2/2020 | Wisniewski et al. | |
| 2020/0111080 | A1 * | 4/2020 | Metcalfe | H04L 9/3255 |

(Continued)

OTHER PUBLICATIONS

International Search Report and Written Opinion completed on Feb. 10, 2023 in corresponding Application No. PCT/EP2022/079194; 13 pages.

(Continued)

*Primary Examiner* — Moeen Khan
(74) *Attorney, Agent, or Firm* — Erik Swanson; Andrew M. Calderon; Calderon Safran & Wright P.C.

(57) ABSTRACT

A computer-implemented method for providing a secure data access service that encrypts data is disclosed. The method includes: wrapping a data encryption key by at least two customer root keys, wherein the at least two customer root keys are assigned to different user identifiers, and wherein the at least two customer root keys are stored in different hardware security modules, and wherein a wrapping structure for the at least two customer root keys is applied according to an access policy that defines which of the assigned user identifiers must concur to enable a data access to the encrypted data by the secure data access service; and encrypting the data by the secure data access service using the unwrapped data encryption key.

17 Claims, 6 Drawing Sheets

(56) References Cited

U.S. PATENT DOCUMENTS

| | | |
|---|---|---|
| 2020/0169395 A1 | 5/2020 | Hong et al. |
| 2020/0195621 A1 | 6/2020 | Li et al. |
| 2021/0014044 A1* | 1/2021 | Bursell .................. H04L 9/083 |
| 2021/0194678 A1* | 6/2021 | Schindewolf ........... G06F 16/25 |

OTHER PUBLICATIONS

Disclosed Anonymously, "System and Method to Use Hybrid Data Encryption Keys for Dataat-Rest Encryption in Cloud", An IP.com Prior Art Database Technical Disclosure, IP.com Electronic Publication Date Feb. 1, 2021, IP.com No. IPCOM000264856D, 4 pages.
Mell et al., "The NIST Definition of Cloud Computing", NIST, Special Publication 800-145, Sep. 2011, 7 pages.
Unknown author, https://cloud.ibm.com/docs/key-protect, 4 pages. downloaded on Nov. 29, 2021.
Unknown author, https://cloud.ibm.com/docs/hs-crypto, 4 pages. downloaded on Nov. 29, 2021.

\* cited by examiner

| 102 | wrapping a data encryption key by at least two customer root keys |

| 104 | encrypting the data by the secure data access service using the unwrapped data encryption key |

ENFORCING MULTI-OWNERSHIP OF DATA ON STORAGE

BACKGROUND

The disclosure relates generally to a computer-implemented method for providing a secure data access, and more specifically, to a computer-implemented method for providing a secure data access service that encrypts data. The disclosure relates further to a data protection system for providing a secure data access service that encrypts data, and a computer program product.

Protecting enterprise or government data in any storage system but, in particular on cloud storage systems, is a must in view of the increasing number of cyber-attacks. Very often, sensitive data in the cloud are protected by an (hardware security module) (HSM) service. Examples of this are products like Key Protect or Hyper Protect Crypto Services from IBM. A data service uses the customer root key (CRK) in the respective HSM to give the client control over its data. Hence, the cloud operator may typically not access the encrypted data. This concept also includes a CRK rotation and cryptographic erasure of data by revoking the CRK, which means that the service can no longer access data.

However, the HSM is typically administered by a client administrator. Theoretically, as well as often practically, the user can access the data although, from an organizational perspective, the user shall not have access. So far, organizational processes have been used to prevent access to encrypted data by the customer or client operator. However, it has been proven that the organizational processes are not "water-tight" so that it would be useful to have a technical implementation for this.

There are several disclosures related to the encrypting of data. E.g., US Publication No. 2020/0195621 A1 discloses a method, an apparatus and a computer program product for encrypting and decrypting data using multiple authority keys including receiving, from a first computing device, a data decrypt request to decrypt encrypted data and determining that the user key is associated with the key hierarchy that comprises the server key.

Additionally, Publication No. US 2019/0173674 A1 discloses a method facilitating and enabling key encryption key (KEK) rotation for a running multi-tenant system without requiring system downtime or interruption. The example method facilitates decrypting a set of one or more DEKs using a preexisting KEK; using a new KEK to re-encode the DEKs using the new KEK, all while simultaneously enabling servicing of tenant requests.

However, the disadvantage of known solutions may be that an access by an individual and malicious administrator cannot be completely prevented.

Hence, there may be a need to overcome this security hole and technically prevent that a single operator or administrator may access encrypted data without authorization.

SUMMARY

According to an aspect of the present disclosure, a computer-implemented method provides a secure data access service that encrypts data may be provided. The method may comprise wrapping a data encryption key by at least two customer root keys, wherein the at least two customer root keys are assigned to different user identifiers, and wherein the at least two customer root keys are stored in different hardware security modules, and wherein a wrapping structure for the at least two customer root keys is applied according to an access policy that defines which of the assigned user identifiers must concur to enable a data access to the encrypted data by the secure data access service. Moreover, the method may comprise encrypting the data by the secure data access service using the unwrapped data encryption key.

According to another aspect of the present disclosure, a data protection system provides a secure data access service that encrypts data may be provided. The system may comprise a processor and a memory, communicatively coupled to the processor, wherein the memory stores program code portions that, when executed, enable the processor, to wrap a data encryption key by at least two customer root keys, wherein the at least two customer root keys are assigned to different user identifiers, and wherein the at least two customer root keys are stored in different hardware security modules, and wherein a wrapping structure for the at least two customer root keys is applied according to an access policy that defines which of the assigned user identifiers must concur to enable a data access to the encrypted data by the secure data access service. The processor may further be enabled to encrypt the data by the secure data access service using the unwrapped data encryption key.

The proposed computer-implemented method for providing a secure data access service that encrypts data may offer multiple advantages, technical effects, contributions and/or improvements:

In general, sensitive, encrypted data may be protected much better with the technical concept proposed here. Advantageously, it may be prevented that a single operator or administrator may access encrypted data alone and without any third party control. This is achieved by a double ownership of the data, i.e., the novel access method. Thereby, it may be technically enforced that a data access may only be possible if two customer root keys are used in combination in order to unwrap a data encryption (decryption) key. The at least two customer root keys used to protect the data encryption key or the data access key are protected by hardware security modules which are linked to individual user IDs of the respective operators. Hence, at least two operators or administrators may be required independently in order to facilitate any access to the sensitive data.

Thereby, in particular in cloud computing environments, the impossible and un-allowed data access by the cloud storage provider may remain intact. Furthermore, it may also be enforced, that one of the at least two customer root keys may be controlled by an official governmental or other enabled authority.

As a consequence, in an illustrative example, the situation where on operator alone may have access to the salary of an executive director of the company can be completely avoided.

Another aspect is that each owner of a customer root key can unilaterally block access to data. Use cases of this aspect include cryptographically erasing content by disabling access to the data in the clear by disabling access to the data encryption key used for the actual data.

In the following, additional embodiments of the disclosure, applicable for the method as well as for the system, will be described.

According to embodiments, the wrapping structure may define a sequence of application of the at least two customer root keys for the wrapping of the data encryption key. The wrapping structure may be defined as a part of the access policy in which it may also be defined that a multi-user root key may have to be used to encrypt or decrypt the data encryption key DEK. Alternatively, the sequence of application of the at least two customer root keys may be defined within the secure data access service or in a storage, only accessible by the secure data access service. A useful sequence of wrapping may be defined by ascending or descending order of the customer root keys. This approach is also expandable to a plurality of customer root keys.

According to an embodiment, the secure data access service may store only the wrapped data encryption key wDEK. Hence, the unwrapped data encryption key may only be available within the secure data access service as long it may be required to encrypt or decrypt the data associated with it. This way, the secure data access service may be constructed in a temper-proven way. Alternatively, the secure data access service may only comprise a pointer to the wrapped data encryption and/or decryption key.

According to an advantageous embodiment, the different hardware security modules may be physical different hardware security modules (HSM), virtual different hardware security modules or a mixture thereof. Using an HSM (or more) has been proven to be one of the safest methods to protect data against unauthorized access. The proposed concept brings this level of security again to a higher level.

According to a further embodiment, the at least two customer root keys are n customer root keys out of m customer root keys, wherein m>n. This may expand the level of protection even further as more customer root keys may be required, i.e., more than two operators with related user or operator identities (i.e., user IDs) may be required for an allowed data access. Moreover, this approach adds flexibility. As an example: If five operators are generally allowed to have access rights to the secure data, it can be defined that only any combination of two or three or four or five operators may be needed to access the data. In general, the number of possible combinations may be determined by the formula (m!/n!*(m−n), wherein m is comparably close to n).

Furthermore, from an organizational perspective, which may also be enabled by a technical implementation, one of the n customer root keys may belong to a regulatory authority. Hence, the operators may never be allowed to access the data by a combination of them alone. It may always be required to have a regulator as part of the group. As a consequence, very sophisticated policies can be implemented through appropriate wrapping schemes.

According to a further embodiment, the at least two customer root keys may be symmetric encryption/decryption keys. Because none of the keys may be transported along publicly accessible communication lines, a symmetric key may be sufficient. Hence, only one encryption/decryption key may be required by the secure data access service and it may be easier to define the sequence according to which the customer root keys may have to be applied.

According to another optional embodiment, the at least two customer root keys may have to be different. This may further enhance data security because it may be enforced that none of the at least two customer root keys may have the same value. Hence, no single human operator may get access to the data by logging in with two user IDs and using the same customer root key.

According to further embodiments, the data encryption key may be a symmetric or asymmetric key. Thereby, the wrapping keys, i.e., the customer root keys, may be used to wrap the symmetric encryption/decryption key or the asymmetric key pair for encryption and decryption. This may be useful if the data may be encrypted and decrypted at different ends of a public communication line.

According to another embodiment, the data encryption key may only be valid for a limited time window. Also this feature may increase data security. If the data encryption key may expire, the data may have to be decrypted with the old encryption key (if it is a symmetric key) and encrypted again with then new data encryption key. Furthermore, the new data encryption key may have to be wrapped with the at least two customer root keys. From there on, only the new data encryption key may enable a proper encryption as well as a decryption of the secured data.

According to another embodiment, the wrapping structure may define a sequence of application of the at least two customer root keys for an unwrapping of the data encryption key. Hence, for the wrapping of the data encryption/decryption key and the unwrapping of the data encryption/decryption key, the same sequence may be enforced. Typically, this is a consequence of the symmetric character of the customer root keys. This may also be codified in the access policy.

According to another embodiment, the unwrapped data encryption key may be passed from a security service to another data access function for a final data access. Thus, the data encryption key is not used directly for a data access but it may pass the unwrapped data access key to another service which then may access the data. This may be a useful approach to service chaining. Thus, the secure data access service may provide its wrapping/unwrapping service for several other services that ultimately accessing the data. Hence, a central control of the wrapping/unwrapping may exist in a complex service-oriented architecture (SOA). Such architecture may enhance successfully legacy installations and may improve a more central any coordinated control of a data access.

Furthermore, embodiments may take the form of a method, related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the disclosure are described with reference to different subject-matters. In particular, some embodiments are described with reference to methods, whereas other embodiments are described with reference to apparatus. However, a person skilled in the art will gather from the above and the following description that, unless otherwise specifically disclosed, in addition to any combination of features belonging to one type of subject matter, any combination between features relating to different subject matters, in particular, between features of the method, and features of the apparatus and systems and computer program products, is considered as to be disclosed within this document.

The aspects defined above and further aspects of the present disclosure are apparent from the examples of embodiments to be described hereinafter and are explained with reference to the examples of embodiments, to which the disclosure is not limited.

Preferred embodiments of the disclosure will be described, by way of example only, and with reference to the following drawings.

Figure 1:
Figure 1:

FIG. 1 shows a block diagram of an embodiment of the inventive computer-implemented method for providing a secure data access service that encrypts data.

Figure 2:
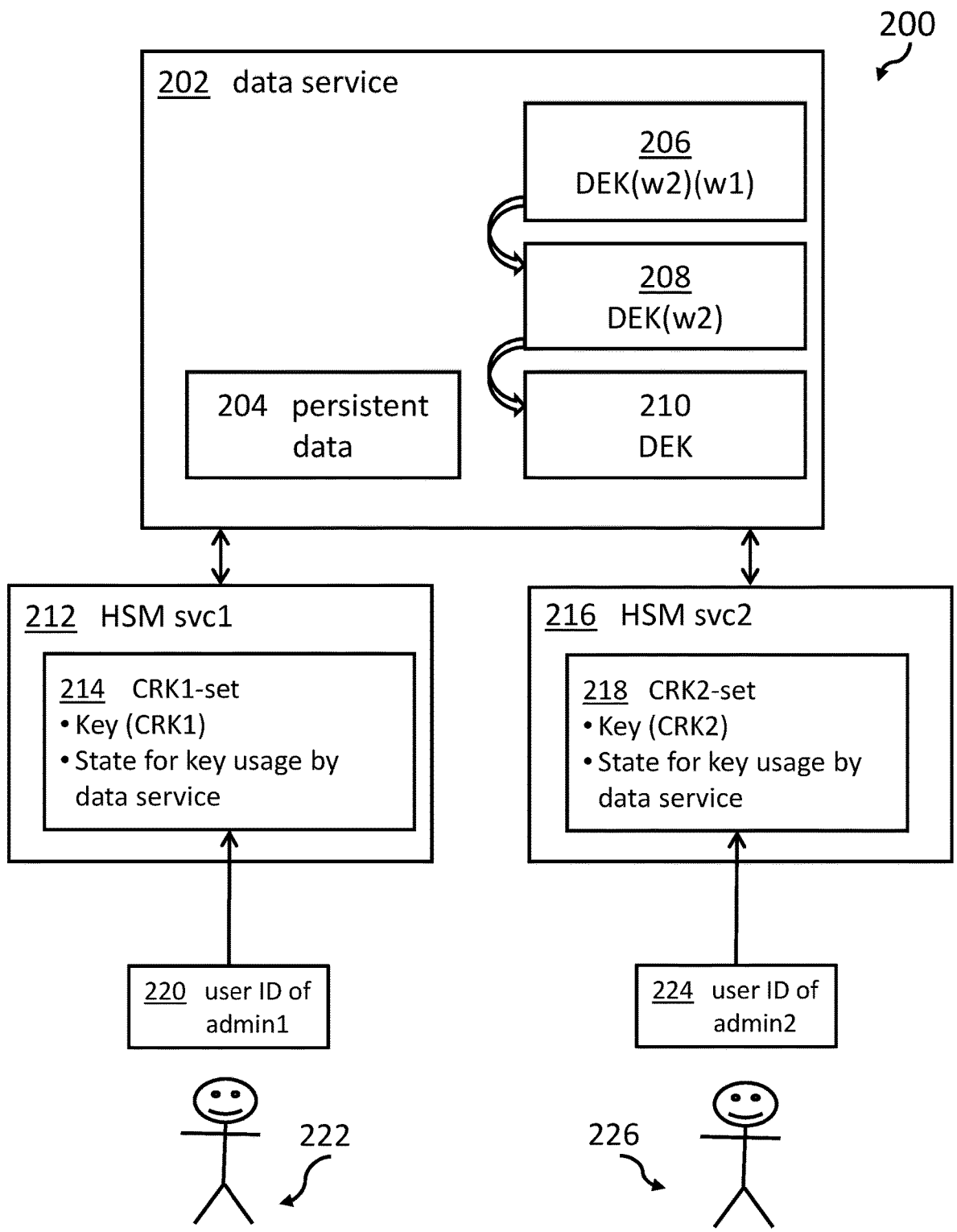

FIG. 2 shows a block diagram of an embodiment of components instrumental for the proposed concept.

Figure 3:
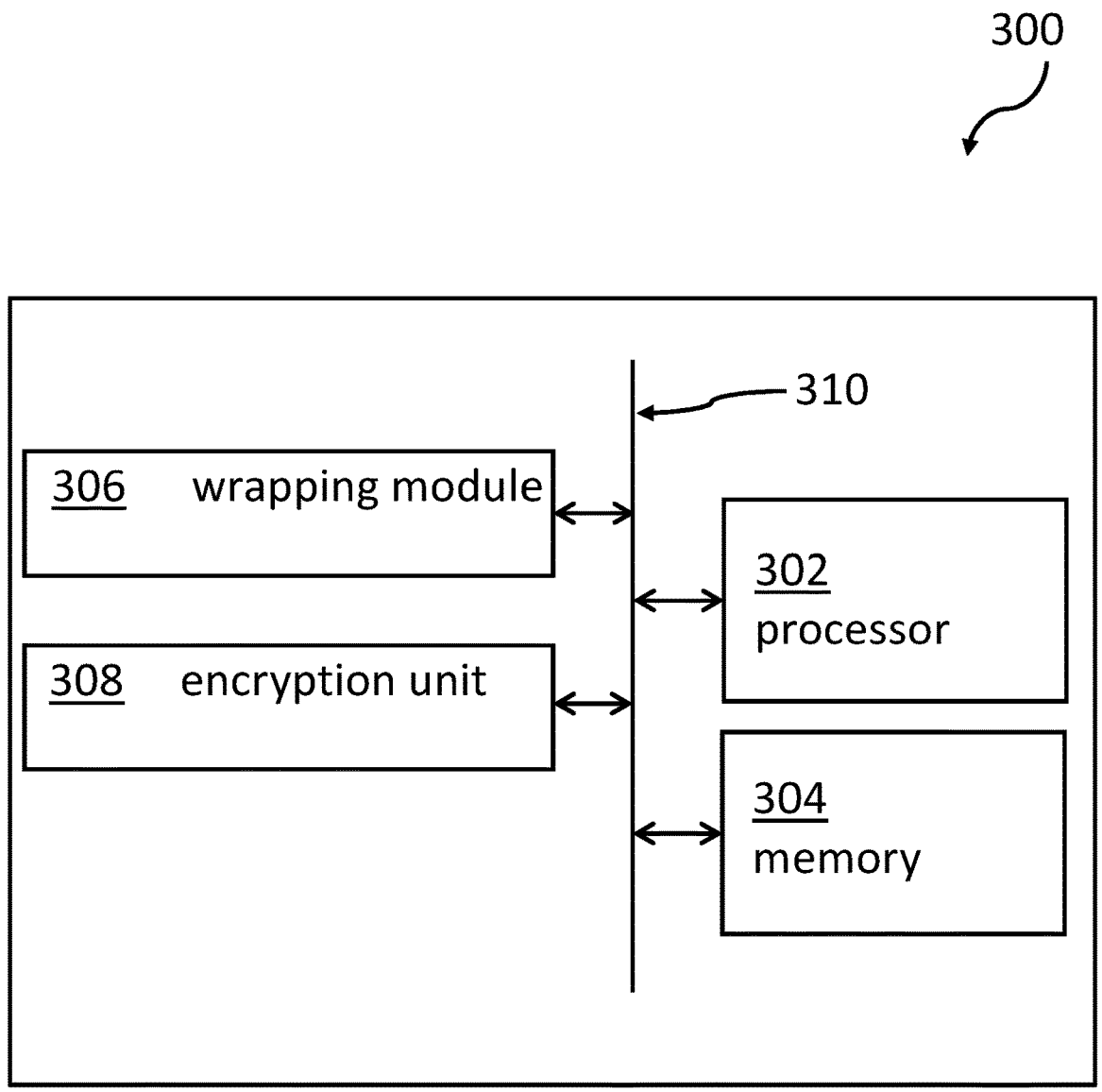

FIG. 3 shows a block diagram of an embodiment of the inventive data protection system for providing a secure data access service that encrypts data.

Figure 4:
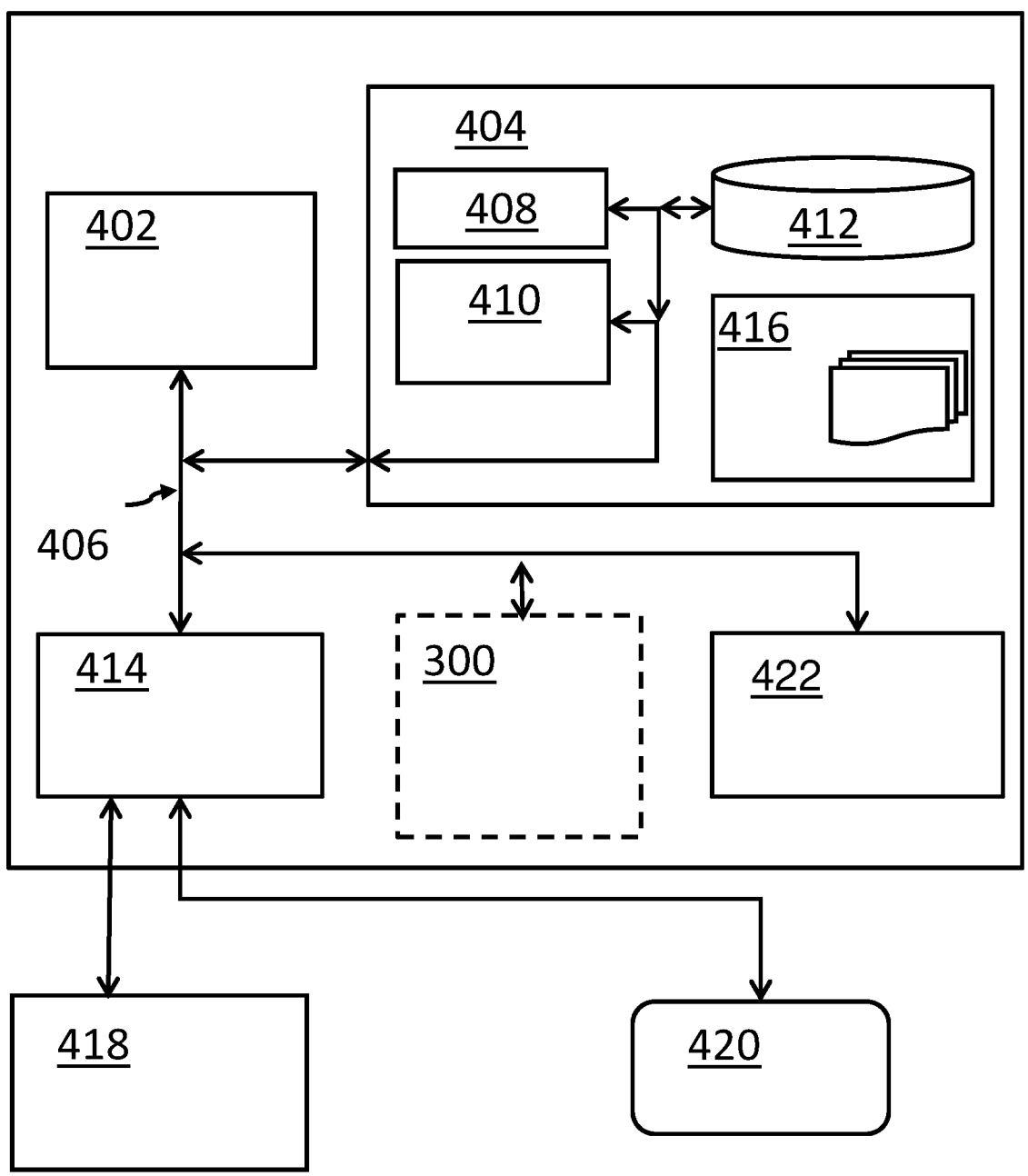

FIG. 4 shows an embodiment of a computing system comprising the system according to FIG. 3.

Figure 5:
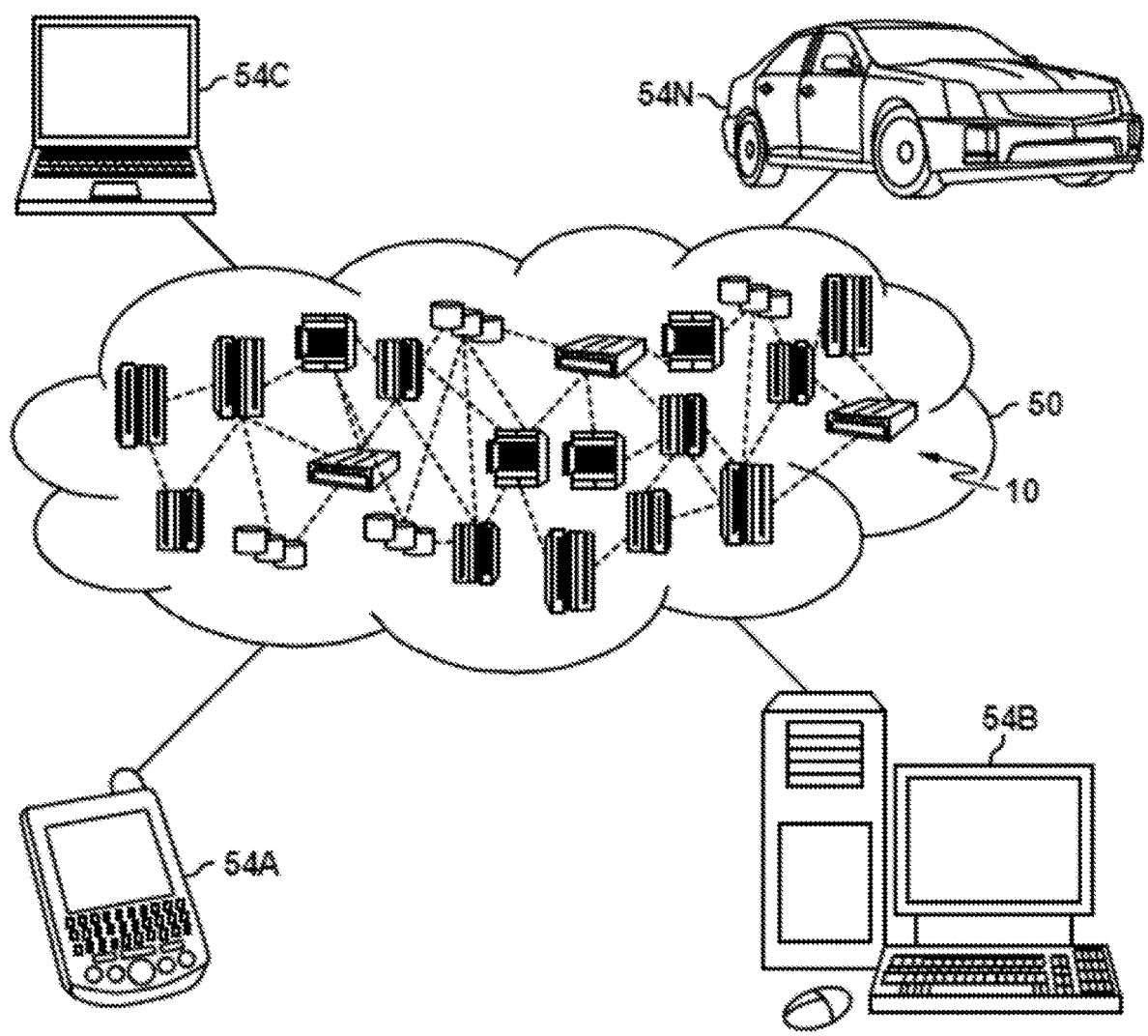

FIG. 5 depicts a cloud computing environment according to an embodiment of the present invention.

Figure 6:
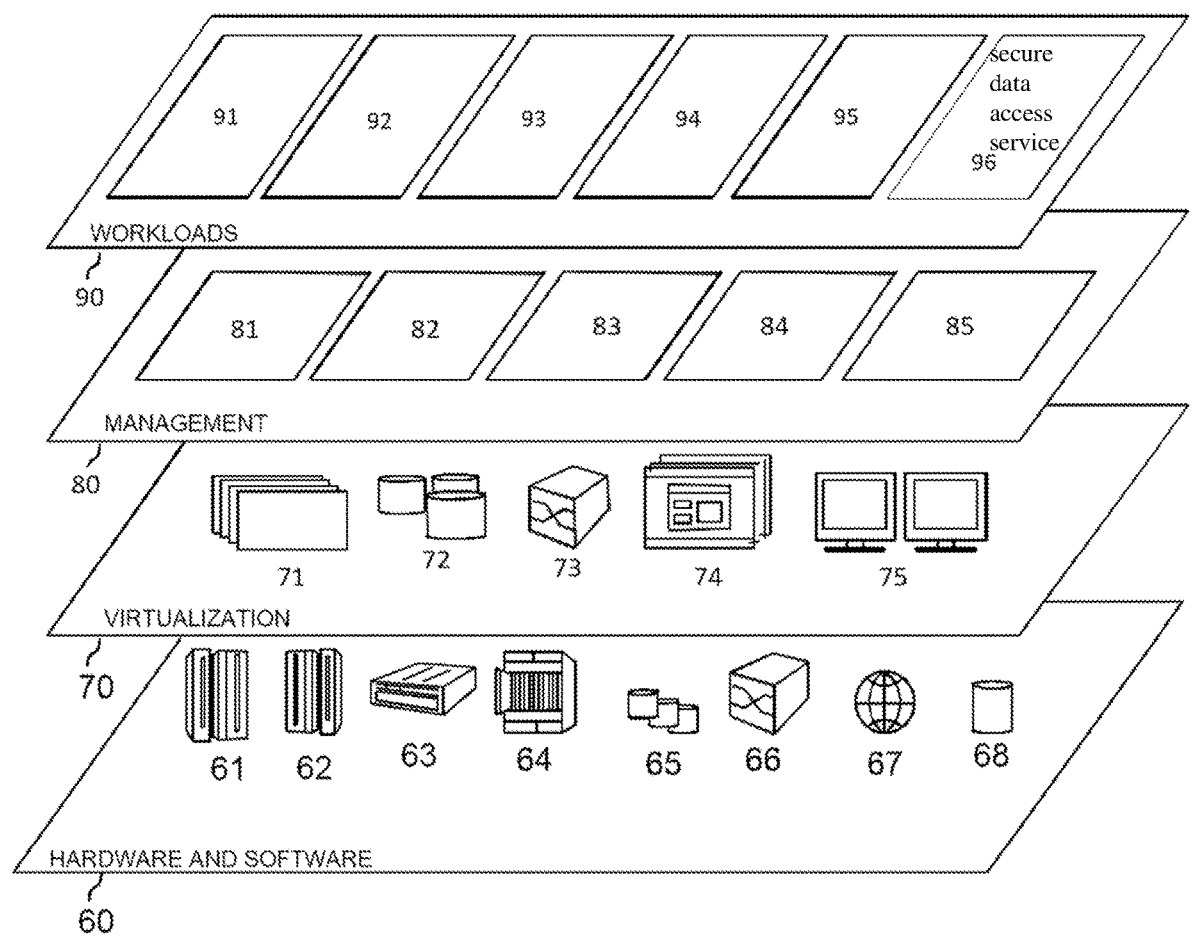

FIG. 6 depicts abstraction model layers according to an embodiment of the present invention.

DETAILED DESCRIPTION

In the context of this description, the following conventions, terms and/or expressions may be used:

The term 'secure data access service' may denote the data service proposed here accessing encrypted data, or encrypting them, with a data access key DEK which may be wrapped by at least two customer root keys.

The term 'encrypted data' may denote the known process in cryptography by which information or data may be encoded by a key. The key may be a symmetric key or in an asymmetric key. Encrypted data may only be accessed again if the decryption key is known.

The term 'hardware security module' may denote a physical computing device that may safeguard and manage digital data access keys. It may also enable and perform an encryption and decryption for digital signatures, strong authentication and other cryptographic functions. Such hardware security modules are typically used in enterprise class computer systems.

The term 'wrapping structure' may denote a sequence by which a plurality of wrapping keys may be applied in order to protect data, i.e., a data encryption key.

The term 'access policy' may denote rules according to which a data access to certain data may be allowed. Often, data access policies reflect organizational requirements. However, it may also be possible that specific technical rules are defined in the access policy which need to be applied to decrypt data in a sequential way. E.g., if a plurality of customer root keys may be required to decrypt a data encryption key, the access policy may define that the keys have to be applied in an, e.g., ascending or descending (or any other predefined) order of the key identifiers or the keys itself.

The term 'data encryption key' may denote a digital bit sequence required to encode data. In addition, a data decryption key may denote a digital bit sequence required to decode the data again.

The term 'wrapped data encryption key' may denote a data encryption key which may again be encrypted, i.e., wrapped, by a wrapping key.

In the following, a detailed description of the figures will be given. All instructions in the figures are schematic. Firstly, a block diagram of an embodiment of the computer-implemented method provides a secure data access service that encrypts data is given. Afterwards, further embodiments, as well as embodiments of the data protection system which provides a secure data access service that encrypts data will be described.

FIG. 1 shows a block diagram of a preferred embodiment of the computer-implemented method 100 for providing a secure data access service that encrypts data. The method 100 comprises, for example, wrapping, 102, a data encryption key, and potentially also a decryption key, in case of an asymmetric key pair, by at least two customer root keys.

Thereby, the at least two customer root keys are assigned to different user identifiers, and the at least two customer root keys are stored in different hardware security modules. Furthermore, a wrapping structure for the at least two customer root keys is applied according to an access policy that defines which of the assigned user identifiers must concur to enable a data access to the encrypted data by the secure data access service. One of the access policies may define the sequence by which the unwrapping the two customer root keys has to be performed. Alternatively, this unwrapping sequence may also be codified within the secure data access service. Furthermore, also an "m out of n" rule may be defined by the access policy.

Furthermore, the method 100 comprises encrypting, 104, the data by the secure data access service using the unwrapped data encryption key. To secure the data by the data encryption key, any known encryption method may be used. Hence, the disclosure does not limit or negatively influence the use of the data encryption key in any form.

FIG. 2 shows a block diagram 200 of an embodiment of components instrumental. The secure data access service 202 manages the access to the persistent data 204 which are encrypted by the data encryption key DEK which may, typically but not necessary, be a symmetric data access key. The data may be stored as part of the secure data access service or externally. Furthermore, the secure data access service 202 may also be implemented directly into a hardware device like a storage system. The persistent data may be part of the secure data access service 202 (as shown) or its persistent storage can be managed outside the secure data access service 202.

The DEK 210 will not be stored unwrapped in the secure data access service 202. Hence, in an unwrapped form, it will have only a transient character. The DEK 210 can only be accessed when it is unwrapped using a second of at least two customer root keys CRK2. DEK 210 wrapped with the customer root key 2, 208, is also only available in transient form in the secure data access service 202.

A second wrapping layer, in particular, by the first of the at least two customer root keys, is securing DEK 210 by the customer root key 2. Hence, DEK 210 is wrapped twice. However, the customer root keys are typically not even available in transient form in the secure data access service 202. Only the double wrapped DEK 210 is available in the form DEK(w2)(w1) 206.

The customer root keys CRK1 214 and CRK2 218 are stored independently of each other in the hardware security modules and/or a related service HSM svc 1 212 and HSM svc2 216. If the secure data access service needs to encrypt or decrypt the data, the secure data access service 202 requests an unwrapped operation on DEK(w2)(w1) 206 and DEK(w2) from the respective HSM svc 1 212 and HSM svc2 216. In case more customer root keys are required, even more calls to the respective HSMs are required.

As a consequence, and in contrast to existing technologies, none of the administrators or operators 222, 226 can access the persistent data 204 independently of one another. Operator 222, using the user ID 220 of admin 1, may enable or set the customer root key 1; whereas operator 226, using the user ID 224 of admin2, may independently enable or set the customer root key 2.

It may be noted that this implementation form represents a basic version. However, implementations with more than two customer root keys or an "m out of n" implementation would be done accordingly with more wrapping layers.

The flow between the just mentioned components can be summarized as follows: During the instantiation of the secure data access service, the following happens. The data service instantiation is started by specifying customer root key identifiers and related HSMs as well as the required access policy for the service. Then, the data service generates the data encryption key DEK which is used for the actual data encryption (as well as the decryption in case of a symmetric key). The secure data access service generates a list of combinations to support the required access policy. Thereby, for each combination, the secure data service defines the order of the CRKs to be used for wrapping. For example, this may be done in an ascending order of key-IDs. However, any other rule may be applied for the ordering of the wrapping/dewrapping. Next, the secure data access service sequentially asks the related HSMs in combination to incrementally wrap or unwrapped the data encryption key DEK, i.e., wrapping wrapped DEK, etc.

During the use of the secure data access service the following happens: If the unwrapped, i.e., transient, DEK is not available, e.g., because it has expired, the secure data access service selects the order that satisfies the access policy (e.g., in a 3-out-of-5 scenario: attempt 1-2-3) and the secure data access service selects the multiple wrapped DEK and unwraps it in the given order (e.g., by an ascending or descending key-IDs). If one of the HSMs refuses to support the data service, e.g., in case the key is suspended or revoked, the secure data access service starts over, using the next sensible combination (e.g., if unwrapped with 2 failed: start over was 1-3-4). Finally, the unwrapped (i.e., transient) DEK is used for the data access operation.

FIG. 3 shows a block diagram of an embodiment of the data protection system 300 which provides a secure data access service that encrypts data. The data protection system 300 (in short, system 300) comprises a processor 302 and a memory 304, communicatively coupled to the processor 302, wherein the memory 304 stores program code portions that, when executed, enable the processor 302, to wrap-in particular, by a wrapping module 306 of the secure data access service module 310-a data encryption key by at least two customer root keys. Thereby, the at least two customer root keys are assigned to different user identifiers, and the at least two customer root keys are stored in different hardware security modules. Furthermore, a wrapping structure for the at least two customer root keys is applied according to an access policy that defines which of the assigned user identifiers must concur to enable a data access to the encrypted data by the secure data access service.

Additionally, the processor 302 is enabled to encrypt-in particular, by an encryption unit of the secure data access service module 310 (c.f., FIG. 2, 202) the data by the secure data access service using the unwrapped data encryption key.

It shall be understood that all functional units, modules and functional blocks, in particular, the processor 302, the memory 304, the secure data access service module 310, as well as the wrapping module 306 and encryption unit 308, may be communicatively coupled to one another for signal or message exchange in a selected 1:1 manner. Alternatively the functional units, modules and functional blocks can be linked to a system internal bus system 312 for a selective signal or message exchange.

Embodiments of the disclosure may be implemented together with virtually any type of computer, regardless of the platform being suitable for storing and/or executing program code. FIG. 4 shows, as an example, a computing system 400 suitable for executing program code related to the proposed method.

The computing system 400 is only one example of a suitable computer system, and is not intended to suggest any limitation as to the scope of use or functionality of embodiments of the invention described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors or processing units 402, a system memory 404, and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, memory 404 may include at least one program product having a set (e.g., at least one) of program modules that are configured to carry out the functions of embodiments of the invention.

The program/utility, having a set (at least one) of program modules 416, may be stored in memory 404 by way of example, and not limiting, as well as an operating system, one or more application programs, other program modules, and program data. Each of the operating systems, one or more application programs, other program modules, and program data or some combination thereof, may include an implementation of a networking environment. Program modules 416 generally carry out the functions and/or methodologies of embodiments of the invention, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of the computer system/server 400 via bus 406. It should be understood that, although not shown, other hardware and/or software components could be used in conjunction with computer system/server 400. Examples, include, but are not limited to: microcode, device drivers, redundant processing units, external disk drive arrays, RAID systems, tape drives, and data archival storage systems, etc.

Additionally, the data protection system 300 for providing a secure data access service that encrypts data may be attached to the bus system 406.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semiconductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure data access service that encrypts data 96.

The terminology used herein is for the purpose of describing particular embodiments only and is not intended to limit the invention. As used herein, the singular forms a, an, and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A summary is provided below:
1. A computer-implemented method for providing a secure data access service that encrypts data, the method comprising
    wrapping a data encryption key by at least two customer root keys, wherein the at least two customer root keys are assigned to different user identifiers, and wherein the at least two customer root keys are stored in different hardware security modules, and wherein a wrapping structure for the at least two customer root keys is applied according to an access policy that defines which of the assigned user identifiers must concur to enable a data access to the encrypted data by the secure data access service, and encrypting data by the secure data access service using an unwrapped data encryption key.
2. The method according to clause 1, wherein the wrapping structure defines a sequence of application of the at least two customer root keys for the wrapping of the data encryption key.
3. The method according to clause 1 or 2, wherein the secure data access service stores only the wrapped data encryption key.
4. The method according to any of the preceding clauses, wherein the different hardware security modules are physical different hardware security modules, virtual different hardware security modules or a mixture thereof.
5. The method according to any of the preceding clauses, wherein the at least two customer root keys are n customer root keys out of m customer root keys, wherein m<n.
6. The method according to any of the preceding clauses, wherein the at least two customer root keys symmetric encryption/decryption keys.
7. The method according to any of the preceding clauses, wherein the at least two customer root keys have to be different.
8. The method according to any of the preceding clauses, wherein the data encryption key is a symmetrical or asymmetric key.
9. The method according to any of the preceding clauses, wherein the data encryption key is only valid for a limited time window.
10. The method according to any of the preceding clauses, wherein the wrapping structure defines a sequence of application of the at least two customer root keys for an unwrapping of the data encryption key.
11. The method according any of the preceding clauses, wherein the unwrapped data encryption key is passed from a security service to another data access function for a final data access.
12. A data protection system for providing a secure data access service that encrypts data, the data protection system comprising a processor and a memory, communicatively coupled to the processor, wherein the memory stores program code portions that, when executed, enable the processor, to
    wrap a data encryption key by at least two customer root keys, wherein the at least two customer root keys are assigned to different user identifiers, and wherein the at least two customer root keys are stored in different hardware security modules, and wherein a wrapping structure for the at least two customer root keys is applied according to an access policy that defines which of the assigned user identifiers must concur to enable a data access to the encrypted data by the secure data access service, and encrypt data by the secure data access service using an unwrapped data encryption key.

13. The data protection system according to clause 12, wherein the wrapping structure defines a sequence of application of the at least two customer root keys for the wrapping of the data encryption key.

14. The data protection system according to clause 12 or 13, wherein the secure data access service stores only the wrapped data encryption key.

15. The data protection system according to any of clauses 12 to 14, wherein the different hardware security modules are physical different hardware security modules, virtual different hardware security modules or a mixture thereof.

16. The data protection system according to any of clauses 12 to 15, wherein the at least two customer root keys are n customer root keys out of m customer root keys, wherein m<n.

17. The data protection system according to any of clauses 12 to 16, wherein the at least two customer root keys are symmetric encryption/decryption keys.

18. The data protection system according to any of clauses 12 to 17, wherein the at least two customer root keys have to be different.

19. The data protection system according to any of clauses 12 to 18, wherein the data encryption key is only valid for a limited time window.

20. A computer program product for data protection system, the computer program product comprising a computer readable storage medium having program instructions embodied therewith, the program instructions being executable by one or more computing systems or controllers to cause the one or more computing systems to
    wrap a data encryption key by at least two customer root keys, wherein the at least two customer root keys are assigned to different user identifiers, and wherein the at least two customer root keys are stored in different hardware security modules, and wherein a wrapping structure for the at least two customer root keys is applied according to an access policy that defines which of the assigned user identifiers must concur to enable a data access to the encrypted data by the secure data access service, and encrypt data by the secure data access service using an unwrapped data encryption key.

What is claimed is:

1. A computer-implemented method for providing a secure data access service that encrypts data, said computer-implemented method comprising:
    wrapping a data encryption key, which is only valid for a limited time window, by at least two customer root keys to obtain a wrapped data encryption key, wherein said at least two customer root keys are assigned to different user identifiers, said at least two customer root keys are stored in different hardware security modules which are linked to individual user identifiers of respective operators, and wherein wrapping the data encryption key further comprises a wrapping structure codified within the secure data access service for said at least two customer root keys is applied in an ascending or descending order of the at least two customer root keys according to an access policy that defines which of said assigned user identifiers must concur to enable a data access to said encrypted data by said secure data access service, wherein the data encryption key is passed from the secure data access service to another data access function for a final data access;
    and encrypting data by said secure data access service using an unwrapped data encryption key, wherein prior to encrypting the data using the unwrapped data encryption key, the secure data access service requests an unwrapped operation on the wrapped data encryption key and wherein the unwrapped operation on the wrapped data encryption key is performed using the at least two customer root keys in ascending or descending order of the at least two customer root keys according to the access policy.

2. The computer-implemented method according to claim 1, wherein said wrapping structure defines a sequence of application of said at least two customer root keys for said wrapping of said data encryption key.

3. The computer-implemented method according to claim 1, wherein said secure data access service stores only said wrapped data encryption key.

4. The computer-implemented method according to claim 1, wherein said different hardware security modules are virtual different hardware security modules.

5. The computer-implemented method according to claim 1, wherein said at least two customer root keys are n customer root keys out of m customer root keys, wherein m>n.

6. The computer-implemented method according to claim 1, wherein said at least two customer root keys are symmetric encryption/decryption keys.

7. The computer-implemented method according to claim 1, wherein said at least two customer root keys have to be different.

8. The computer-implemented method according to claim 1, wherein said data encryption key is a symmetrical or asymmetric key.

9. The computer-implemented method according to claim 1, wherein said wrapping structure defines a sequence of application of said at least two customer root keys for an unwrapping of said data encryption key.

10. A data protection system for providing a secure data access service that encrypts data, said data protection system comprising:
    a processor and a memory, communicatively coupled to said processor, wherein said memory stores program code portions that, when executed, enable said processor, to:
    wrap a data encryption key, which is only valid for a limited time window, by at least two customer root keys to obtain a wrapped data encryption key, wherein said at least two customer root keys are assigned to different user identifiers, said at least two customer root keys are stored in different hardware security modules which are linked to individual user identifiers of respective operators, and wherein wrapping the data encryption key further comprises a wrapping structure codified within the secure data access service for said at least two customer root keys is applied in an ascending or descending order of the at least two customer root keys according to an access policy that defines which of said assigned user identifiers must concur to enable a data access to said encrypted data by said secure data access service, wherein the data encryption key is passed from the secure data access service to another data access function for a final data access;
    and encrypt data by said secure data access service using an unwrapped data encryption key, wherein prior to encrypting the data using the unwrapped data encryption key, the secure data access service requests an unwrapped operation on the wrapped data encryption key and wherein the unwrapped operation on the wrapped data encryption key is performed using the at least two customer root keys in ascending or descending order of the at least two customer root keys according to the access policy.

11. The data protection system according to claim 10, wherein said wrapping structure defines a sequence of application of said at least two customer root keys for said wrapping of said data encryption key.

12. The data protection system according to claim 10, wherein said secure data access service stores only said wrapped data encryption key.

13. The data protection system according to claim 10, wherein said different hardware security modules are physical different hardware security modules, virtual different hardware security modules or a mixture thereof.

14. The data protection system according to claim 10, wherein said at least two customer root keys are n customer root keys out of m customer root keys, wherein m>n.

15. The data protection system according to claim 10, wherein said at least two customer root keys are symmetric encryption/decryption keys.

16. The data protection system according to claim 10, wherein said at least two customer root keys have to be different.

17. A computer program product for data protection system, said computer program product comprising:
a computer readable storage medium having program instructions embodied therewith, said program instructions being executable by one or more computing systems or controllers to cause said one or more computing systems to:
wrap a data encryption key, which is only valid for a limited time window, by at least two customer root keys to obtain a wrapped data encryption key, wherein said at least two customer root keys are assigned to different user identifiers which are linked to individual user identifiers of respective operators, said at least two customer root keys are stored in different hardware security modules, and wherein wrapping the data encryption key further comprises a wrapping structure codified within the secure data access service for said at least two customer root keys is applied in an ascending or descending order of the at least two customer root keys according to an access policy that defines which of said assigned user identifiers must concur to enable a data access to said encrypted data by said secure data access service, wherein the data encryption key is passed from the secure data access service to another data access function for a final data access;
and encrypt data by said secure data access service using an unwrapped data encryption key, wherein prior to encrypting the data using the unwrapped data encryption key, the secure data access service requests an unwrapped operation on the wrapped data encryption key and wherein the unwrapped operation on the wrapped data encryption key is performed using the at least two customer root keys in ascending or descending order of the at least two customer root keys according to the access policy.

* * * * *